(No Model.)
J. E. MYERS.
PIPE COUPLING.
No. 597,733.  Patented Jan. 25, 1898.
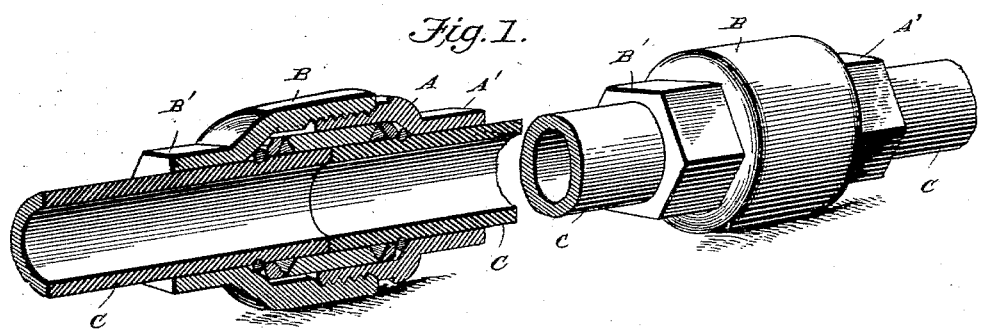
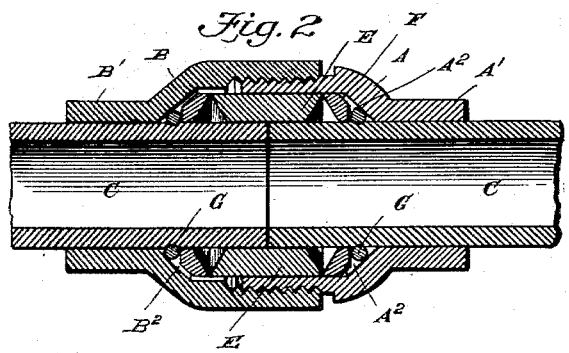
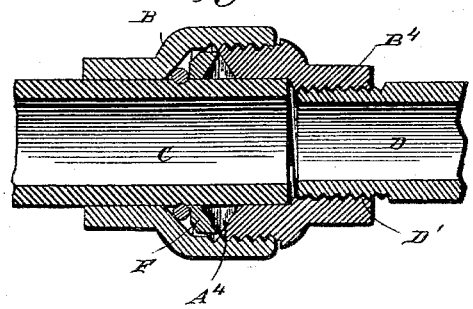
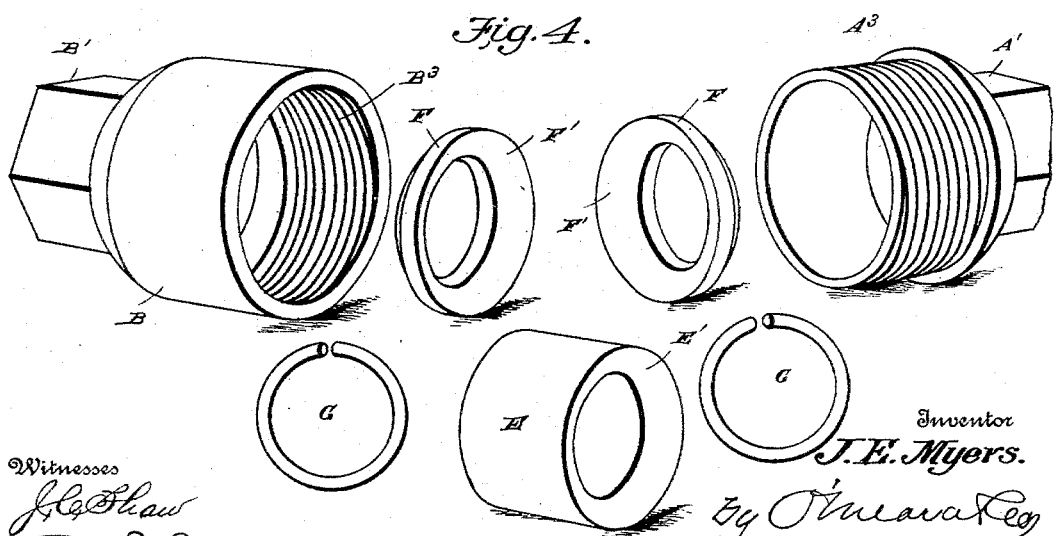
Witnesses
J. C. Shaw
Chas. E. Brock
Inventor
J. E. Myers.
by O'Meara & Co.
Attorneys

UNITED STATES PATENT OFFICE.

JOHN E. MYERS, OF SPRINGFIELD, MISSOURI.

PIPE-COUPLING.

SPECIFICATION forming part of Letters Patent No. 597,733, dated January 25, 1898.

Application filed February 23, 1897. Serial No. 624,646. (No model.)

*To all whom it may concern:*

Be it known that I, JOHN E. MYERS, residing at Springfield, in the county of Greene and State of Missouri, have invented a new and useful Pipe-Coupling, of which the following is a specification.

This invention relates generally to pipe-couplings and more particularly to a detachable pipe-coupling or one which can be quickly and easily connected or disconnected, as desired.

The object of the invention is to provide a pipe-coupling of this kind which can be used for the purpose of joining two lead pipes or one lead pipe and an iron pipe.

With these various objects in view my invention consists, essentially, of a male and female coupling adapted to receive the ends of the pipes to be connected and also adapted to be connected with each other, a packing-gasket surrounding the joints of the pipes with the coupling-sections, the packing-rings, and the wire compression-rings arranged between the packing-rings and the beveled interior shoulders of the coupling-sections.

The invention consists also in certain details of construction and novelties of combination, all of which will be fully hereinafter described, and pointed out in the claims.

In the drawings forming a part of this specification, Figure 1 is a view showing the practical application of my invention, one of the couplings being shown in section. Fig. 2 is a vertical longitudinal section of my coupling used for connecting two pieces of lead pipe. Fig. 3 is a similar view showing the coupling used for connecting a lead and an iron pipe, and Fig. 4 is a view showing the various parts detached.

In the practical embodiment of my invention I employ a male coupling-section A and a female coupling-section B, said sections being made to receive the ends of the lead pipes C or the end of the lead pipes C and iron pipe D. The end sections of the coupling-sections are made polygonal, as shown at A' and B', respectively, in order that a wrench may be fitted thereon for the purpose of turning the same. The mouths of the coupling-sections are somewhat flared, and upon the interior of the sections are produced the beveled or inclined shoulders $A^2$ and $B^2$, respectively.

Furthermore, it will of course be understood that the sections are provided with exterior and interior threads $A^3$ and $B^3$, respectively, for the purpose of securely connecting the sections together.

When the coupling is used for the purpose of connecting a lead and an iron pipe, the end of the male coupling is threaded, as shown at $B^4$, for the purpose of receiving the threaded end D' of the iron pipe D. When the coupling, however, is employed for uniting two pieces of lead pipe, the joint is surrounded by a packing gland or gasket E, the edges of which are chamfered or concaved, as shown at E', and upon each side of the packing gland or gasket is arranged a packing-ring F, the faces thereof adjacent to the gland being chamfered or concaved, as clearly shown, thereby providing a V-shaped annular channel at each side of the packing gland or gasket.

Between the shoulders $A^2$ and $B^2$ and the packing-ring F, I arrange the wire compression-rings G, said rings being so arranged that as the sections are screwed together the ring will be compressed and, in consequence of the beveled shoulders $A^2$ and $B^2$, will bind tightly against the pipe-sections and also against the packing-rings, thereby securely pressing the packing-rings into close contact with the packing-gland. By this arrangement an absolutely tight joint is quickly and easily effected.

In Fig. 3 I have shown a coupling as used in a lead and an iron pipe, and in this construction of coupling it will be of course understood that the female section is constructed identically the same as heretofore. The male coupling is provided with the chamfered or concaved edge $A^4$, which is adapted to come in contact with the packing-ring F, carried by the female coupling, the packing gland or gasket E being entirely dispensed with, and the male coupling is entirely devoid of its packing-ring and compression-ring.

It will thus be seen that I provide an exceedingly cheap and simple construction of pipe-coupling which can be used for connecting the sections of lead pipe or one section of lead pipe with a section of iron pipe.

Having thus described my invention, what I claim as new, and desire to secure by Letters Patent, is—

1. In a pipe-coupling, the combination with the male and female sections, having interior beveled shoulders, of the packing gland or gasket, the packing-ring, and the compression-ring, all arranged and adapted to operate, substantially as shown and described.

2. In a pipe-coupling, the combination with the male and female couplings having interior beveled shoulders, of the packing gland or gasket, having chamfered or concaved edges, the packing-rings arranged upon the opposite sides of the packing gland or gasket, and having chamfered or concaved edges, and the compression-rings arranged between the beveled shoulders of the coupling-sections and the packing-rings, substantially as shown and described.

JNO. E. MYERS.

Witnesses:
CLARENCE HOGAN,
JOS. G. MYERS.